US005811187A

United States Patent [19]

Anderson et al.

[11] Patent Number: 5,811,187

[45] Date of Patent: Sep. 22, 1998

[54] ENVIRONMENTALLY STABLE REACTIVE ALLOY POWDERS AND METHOD OF MAKING SAME

[75] Inventors: Iver E. Anderson; Barbara K. Lograsso; Robert L. Terpstra, all of Ames, Iowa

[73] Assignee: Iowa State University Research Foundation, Inc., Ames, Iowa

[21] Appl. No.: 667,485

[22] Filed: Jun. 24, 1996

Related U.S. Application Data

[60] Continuation of Ser. No. 328,163, Oct. 24, 1994, abandoned, which is a division of Ser. No. 926,151, Aug. 5, 1992, Pat. No. 5,372,629, which is a continuation of Ser. No. 594,088, Oct. 9, 1990, abandoned.

[51] Int. Cl.$^6$ .......... B32B 5/16

[52] U.S. Cl. .......... 428/403; 148/301; 148/302

[58] Field of Search .......... 428/403; 148/301, 148/302, 303

[56] References Cited

U.S. PATENT DOCUMENTS

| | | | |
|---|---|---|---|
| 2,997,245 | 8/1961 | Nilsson et al. | 241/1 |
| 3,067,956 | 12/1962 | Tove | 241/1 |
| 3,302,892 | 2/1967 | Nilsson | 241/1 |
| 3,904,448 | 9/1975 | Takahashi et al. | 148/105 |
| 4,402,770 | 9/1983 | Koon | 148/31.57 |
| 4,533,408 | 8/1985 | Koon | 148/103 |
| 4,585,473 | 4/1986 | Narasimhan et al. | 148/104 |
| 4,597,938 | 7/1986 | Matsuura et al. | 419/23 |
| 4,619,845 | 10/1986 | Ayers et al. | 427/422 |
| 4,801,340 | 1/1989 | Inoue et al. | 148/104 |
| 4,802,931 | 2/1989 | Croat | 148/302 |
| 4,837,114 | 6/1989 | Hamada et al. | 427/127 |
| 4,867,809 | 9/1989 | Haverstick | 148/101 |
| 4,882,224 | 11/1989 | Hideharn et al. | 428/403 |
| 5,073,409 | 12/1991 | Anderson et al. | 427/237 |
| 5,114,502 | 5/1992 | Bogatin | 148/302 |
| 5,125,574 | 6/1992 | Anderson et al. | 239/8 |
| 5,147,448 | 9/1992 | Roberts et al. | 75/331 |
| 5,147,473 | 9/1992 | Ueda et al. | 148/302 |
| 5,240,513 | 8/1993 | Mc Callum et al. | 148/104 |
| 5,242,508 | 9/1993 | Anderson et al. | |

FOREIGN PATENT DOCUMENTS

| | | |
|---|---|---|
| 63-100108 | 5/1988 | Japan . |
| 63-109101 | 5/1988 | Japan . |
| 63-211706 | 9/1988 | Japan . |

OTHER PUBLICATIONS

Fluid Flow Effects In Gas Automization Processing, 1989; I.E. Anderson, et al. International Symposium on the Physical Chemistry of Powder Metal Production and Processing.

Observations Of Gas Automization Process Dynamics MPIF–AMPI, 1988; I.E. Anderson, et al. Modern Development in Powder Metallurgy, MPIF–APMI vol. 20, p. 205.

Narasimhan, iron–based rare–earth magnets, 1985 (Apr.) pp. 4081–4085.

Ultrasonic Gas Automization, MPR, Apr., 1986 pp. 255–260.

R.S. Figliola et al, Flow Measurements in Gas Automation Processes, 1989. pp. 39–47.

Rapid Solidification of a Modified 7075 Aluminum Alloy by Ultrasonic Gas Automization, V. Anand, et al, 1981. pp. 274–286.

*Primary Examiner*—John Sheehan
*Attorney, Agent, or Firm*—Edward J. Timmer

[57] ABSTRACT

Apparatus and method for making powder from a metallic melt by atomizing the melt to form droplets and reacting the droplets downstream of the atomizing location with a reactive gas. The droplets are reacted with the gas at a temperature where a solidified exterior surface is formed thereon and where a protective refractory barrier layer (reaction layer) is formed whose penetration into the droplets is limited by the presence of the solidified surface so as to avoid selective reduction of key reactive alloyants needed to achieve desired powder end use properties. The barrier layer protects the reactive powder particles from environmental constituents such as air and water in the liquid or vapor form during subsequent fabrication of the powder to end-use shapes and during use in the intended service environment.

12 Claims, 6 Drawing Sheets

ENVIRONMENTALLY STABLE REACTIVE ALLOY POWDERS AND METHOD OF MAKING SAME

This application is a continuation of U.S. Ser. No. 08/328,163, filed Oct. 24, 1994, now abandoned, which is a division of Ser. No. 07/926,151, filed Aug. 5, 1992, now U.S. Pat. No. 5,372,629 which is a continuation of Ser. No. 07/594,088, filed Oct. 9, 1990, now abandoned.

CONTRACTUAL ORIGIN OF REFERENCE AND GRANT REFERENCE

The United States Government has rights in this invention pursuant to the Contract No. W-7405-ENG-82 between the U.S. Department of Energy and Iowa State University, Ames, Iowa, which contract grants to Iowa State University Research Foundation, Inc. the right to apply for this patent. The research leading to the invention was supported in part by U.S. Department of Commerce Grant ITA 87-02.

FIELD OF THE INVENTION

The present invention relates to a method of making reactive metallic powder having one or more ultra-thin, beneficial coatings formed in-situ thereon that protect the reactive powder against environmental attack (oxidation, corrosion, etc.) and facilitate subsequent fabrication of the powder to end-use shapes. The present invention also relates to the coated powder produced as well as fabricated shapes thereof.

BACKGROUND OF THE INVENTION

Gas atomization is a commonly used technique for economically making fine metallic powder by melting the metallic material and then impinging a gas stream on the melt to atomize it into fine molten droplets that are solidified to form the powder. One particular gas atomization process is described in the Ayers and Anderson U.S. Pat. No. 4,619,845 wherein a molten stream is atomized by a supersonic carrier gas to yield fine metallic powder (e.g., powder sizes of 10 microns or less).

The metallic powder produced by gas atomization processes is suitable for fabrication into desired end-use shapes by various powder consolidation techniques. However, as a result of the fine size of gas atomized powder (i.e., powder having a high surface to volume ratio), the metallic powder is more susceptible to environmental degradation, such as oxidation, corrosion, contamination, etc. than the same metallic material in bulk form. Some alloy powders, in particular aluminum and magnesium, have been made more stable to environmental constituents by producing a thin oxide film on the powder particles during or after gas atomization. Production of stabilizing refractory films during gas atomization has been effected on aluminum powder by utilizing a recycled gas mixture (flue gas) for the atomization gas and ambient air for the spray chamber environment. During the atomization process the oxygen (or other reactive gas species, like carbon) in this complex gas environment reacts with the aluminum to form a coating on the particles. Stabilizing carbonate/oxide films have been produced on reactive ultrafine metal powders, such as carbonyl-processed iron, following their initial formation by slowly bleeding carbon dioxide gas into the formation chamber and allowing a long exposure time before removal of the particulate. Slow bleeding rates are required to prevent such a temperature rise of the powder during initial reaction as could cause rapid catastrophic powder burning or explosion.

The problem of environmental degradation is especially aggravated when the metallic material includes one or more highly reactive alloying elements that are prone to chemically react with constituents of the environment such as oxygen, nitrogen, carbon, water in the vapor or liquid form and the like. The rare earth-iron-boron alloys (e.g., Nd-Fe-B alloys) developed for magnetic applications represent a particularly troublesome alloy system in terms of reactivity to environmental constituents of the type described, even to the extent of exhibiting pyrophoric behavior in the ambient environment. There is a need to protect such atomized reactive alloy powders from environmental degradation during fabrication operations to form magnet shapes and during use of the magnet in its intended service environment where the magnet is subjected to the environmental constituents described above.

Rare earth-iron-boron alloy powders (made from mechanically milled rapidly solidified ribbon) have been fabricated into magnet shapes by compression molding techniques wherein the alloy powder is mixed at elevated temperature, such as 392° F., with a suitable resin or polymer, such as polyethylene and polypropylene, and the mixture is compression molded to a magnet shape of simple geometry. A surfactant chemical is blended with the resin or polymer prior to mixing with the alloy powder so as to provide adequate wetting and rheological properties for the compression molding operation. Elimination of the need for surfactant chemical is desirable as a way to simplify fabrication of the desired magnet shape and to reduce the cost of fabricating magnets from such powder alloys.

It is an object of the present invention to provide a method of making metallic powder from a melt having a composition including one or more reactive alloying elements in selected concentration to provide desired end-use properties (e.g., magnetic properties) wherein a beneficial coating or layer is formed in-situ thereon that protects the reactive powder against environmental (oxidation, corrosion, etc.) attack.

It is another embodiment of the invention to provide a method of making metallic powder from a melt of the type described in the preceding paragraph wherein a beneficial coating or layer is formed on the powder to facilitate subsequent fabrication of the powder to end-use shapes by mixing with a polymeric or other binder.

It is another object of the present invention to provide reactive metallic powder having one or more coatings that protect against environmental degradation during fabrication of the powder to end-use shapes and during use in the intended service environment.

It is another object of the invention to provide a method of making such coated powder in a manner controlled to avoid altering the powder composition to an extent that would degrade the powder end-use properties (e.g., magnetic properties).

SUMMARY OF THE INVENTION

The present invention involves apparatus and method for making powder from a metallic melt having a composition including one or more reactive alloying elements in selected concentration to provide desired end-use properties. In accordance with the invention, the melt is atomized to form molten droplets and a reactive gas is brought into contact with the droplets at a reduced droplet temperature where they have a solidified exterior surface and where the reactive gas reacts with the reactive alloying element to form a reaction product layer (e.g., a protective barrier layer comprising a refractory compound of the reactive alloying element) thereon. Penetration of the reaction product layer into the droplets is limited by the presence of the solidified surface so as to avoid selective removal (i.e., excess reaction) of the reactive alloying element from the droplet core composition to a harmful level that could substantially degrade the end-use properties of the metallic powder. Preferably, the droplets are atomized and then free fall through a zone of the reactive gas disposed downstream of the atomizing location. The reactive gas zone is located downstream by such a distance that the droplets are cooled to the aforesaid reaction temperature by the time they reach the reactive gas zone. Preferably, the droplets are cooled such that they are solidified from the exterior surface substantially to the droplet core when they pass through the reactive gas zone. The reactive gas preferably comprises nitrogen to form a nitride protective layer, although other gases may be used depending upon the particular reaction product layer to be formed and the composition of the melt.

In one embodiment of the invention, the droplets are also contacted with a gaseous carbonaceous material after the initial reaction product layer is formed to form a carbon-bearing (e.g., graphitic carbon) layer or coating on the reaction product layer.

In another embodiment of the invention, the melt is atomized in a drop tube to form free falling droplets that fall through a reactive gas zone established downstream in the drop tube by a supplemental reactive gas jet. The coated, solidified droplets are collected in the vicinity of the drop tube bottom.

The present invention is especially useful, although not limited, to production of rare earth-transition metal alloy powder with and without boron as an alloyant wherein the powder particles include a core having a composition corresponding substantially to the desired end-use rare earth-transition metal alloy composition, a reaction product layer (environmentally protective refractory barrier layer) of nitride formed in-situ on the core, a mixed rare earth/transition metal oxide layer on the nitride layer and optionally a carbon-bearing layer (e.g., graphitic carbon) on the oxide layer. The nitride layer may comprise a rare earth nitride if no boron is present in the alloy or a boron nitride, or mixed boron/rare earth nitride, if boron is present in the alloy in usual quantities for magnetic applications. The reactivity of the coated rare earth-transition metal alloy powder to environmental constituents, such as air and water in the vapor or liquid form, is significantly reduced as compared to the reactivity of uncoated powder of the same composition. Preferably, the thickness (i.e.. depth of penetration) of the reaction product layer is controlled so as not to exceed about 500 angstroms such that the rare earth component and boron component, if present, of the powder core composition are not selectively removed to a harmful level that substantially degrades the magnetic properties of the powder. The carbon-bearing layer, when present, typically has a thickness of at least about 1 monolayer (2.5 angstroms) so as to provide environmental protection as well as improve wetting of the powder by a binder prior to fabrication of an end-use shape, thereby eliminating the need for a surfactant chemical and facilitating fabrication of magnet or other shapes by injection molding and like shaping processes.

The aforementioned objects and advantages of the present invention will become more readily apparent from the following detailed description taken in conjunction with the drawings.

DETAILED DESCRIPTION OF THE INVENTION

Figure 1:
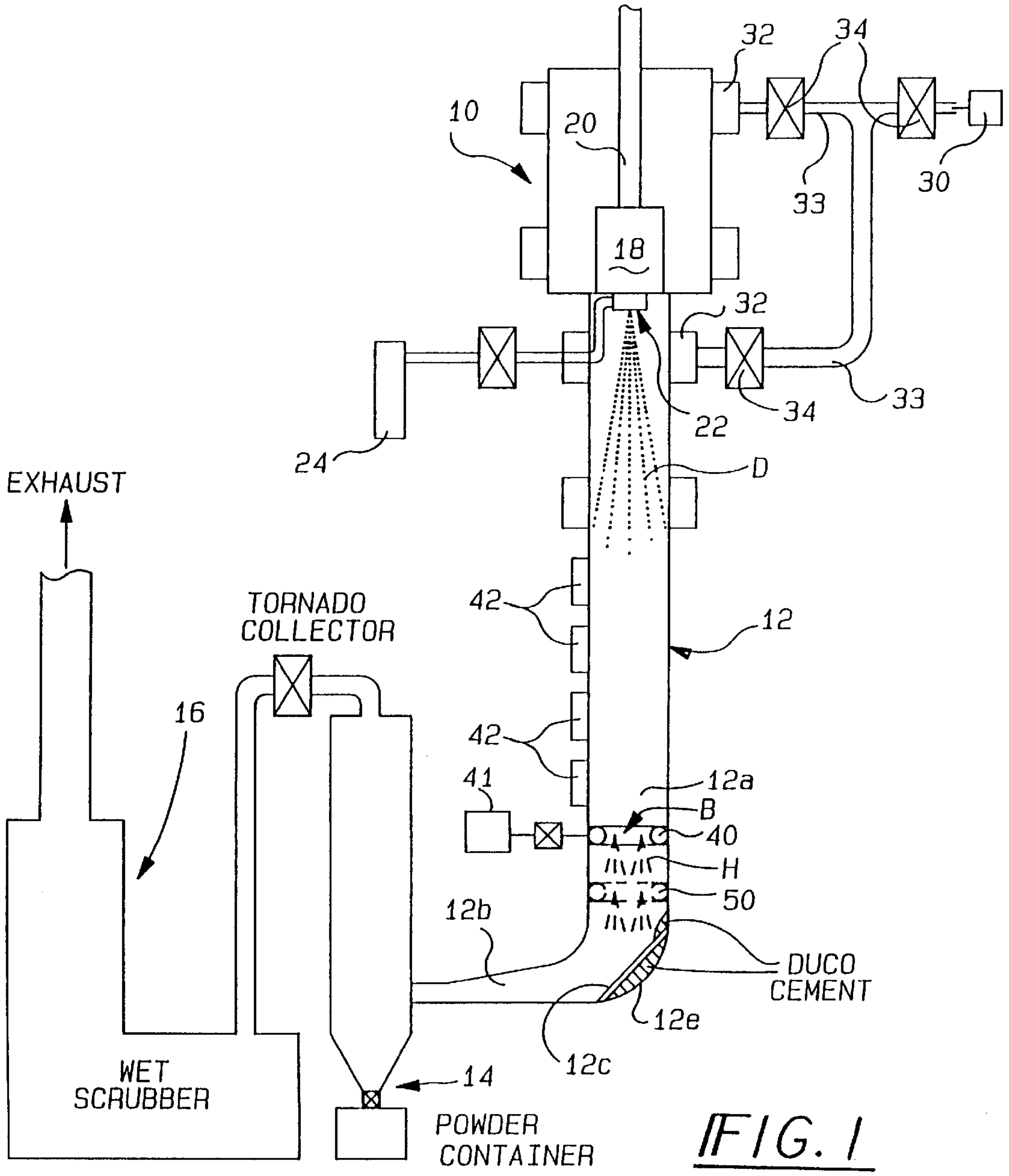
FIG. 1 is a schematic view of atomization apparatus in accordance with one embodiment of the invention.

Referring to FIG. 1, a gas atomization apparatus is shown for practicing the present invention. The apparatus includes a melting chamber 10, a drop tube 12 beneath the melting chamber, a powder collection chamber 14 and an exhaust cleaning system 16. The melting chamber 10 includes an induction melting furnace 18 and a vertically movable stopper rod 20 for controlling flow of melt from the furnace 18 to a melt atomizing nozzle 22 disposed between the furnace and the drop tube. The atomizing nozzle 22 preferably is of the supersonic inert gas type described in the Ayers and Anderson U.S. Pat. No. 4,619,845, the teachings of which are incorporated herein by reference, as-modified in the manner described in Example 1. The atomizing nozzle 22 is supplied with an inert atomizing gas (e.g., argon, helium) from a suitable source 24, such as a conventional bottle or cylinder of the appropriate gas. As shown in FIG. 1, the atomizing nozzle 22 atomizes, melt in the form of a spray of generally spherical, molten droplets D into the drop tube 12.

Both the melting chamber 10 and the drop tube 12 are connected to an evacuation device (e.g., vacuum pump) 30 via suitable ports 32 and conduits 33. Prior to melting and atomization of the melt, the melting chamber 10 and the drop tube 12 are evacuated to a level of $10^{-4}$ atmosphere to substantially remove ambient air. Then, the evacuation system is isolated from the chamber 10 and the drop tube 12 via the valves 34 shown and the chamber 10 and drop tube 12 are positively pressurized by an inert gas (e.g., argon to about 1.1 atmosphere) to prevent entry of ambient air thereafter.

The drop tube 12 includes a vertical drop tube section 12*a* and a lateral section 12*b* that communicates with the powder collection chamber 14. The drop tube vertical section 12*a* has a generally circular cross-section having a diameter in the range of 1 to 3 feet, a diameter of 1 foot being used in the Examples set forth below. As will be explained below, the diameter of the drop tube section 12*a* and the diameter of the supplemental reactive gas jet 40 are selected in relation to one another to provide a reactive gas zone or halo H extending substantially across the cross-section of the drop tube vertical section 12*a* at the zone H.

The length of the vertical drop tube section 12*a* is typically about 9 to about 16 feet, a preferred length being 9 feet being used in the Examples set forth below, although other lengths can be used in practicing the invention. A plurality of temperature sensing means 42 (shown schematically), such as radiometers or laser doppler velocimetry devices, may be spaced axially apart along the length of the vertical drop section 12*a* to measure the temperature of the atomized droplets D as they fall through the drop tube and cool in temperature.

In accordance with the present invention, the supplemental reactive gas jet 40 referred to above is disposed at location along the length of the vertical drop section 12*a* where the falling atomized droplets D have cooled to a reduced temperature (compared to the droplet melting temperature) at which the droplets have at least a solidified exterior surface thereon and at which the reactive gas in the zone H can react with one or more reactive alloying elements of the shell to form a protective barrier layer (reaction product layer comprising a refractory compound of the reactive alloying element) on the droplets whose depth of penetration into the droplets is controllably limited by the presence of the solidified surface as will be described below.

In particular, the jet 40 is supplied with reactive gas (e.g., nitrogen) from a suitable source 41, such as a conventional bottle or cylinder of appropriate gas through a valve and discharges the reactive gas, in a downward direction into the drop tube to establish the zone or halo H of reactive gas through which the droplets travel and come in contact for reaction in-situ therewith as they fall through the drop tube. The reactive gas is preferably discharged downwardly in the drop tube to minimize gas updrift in the drop tube 12. The flow patterns established in the drop tube by the atomization and falling of the droplets inherently oppose updrift of the reactive gas. As a result, a reactive gas zone or halo H having a more or less distinct upper boundary B and less distinct lower boundary extending to the collection chamber 14 is established in the drop tube section 12*a* downstream from the atomizing nozzle in FIG. 1. As mentioned above, the diameter of the drop tube section 12*a* and the jet 40 are selected in relation to one another to establish a reactive gas zone or halo that extends laterally across the entire drop tube cross-section. This places the zone H in the path of the falling droplets D so that substantially all of the droplets travel therethrough and contact the reactive gas.

The temperature of the droplets D as they reach the reactive gas zone H will be low enough to form at least a solidified exterior surface thereon and yet sufficiently high as to effect the desired reaction between the reactive gas and the reactive alloying element(s) of the droplet composition. The particular temperature at which the droplets have at least a solidified exterior shell will depend on the particular melt composition, the initial melt superheat temperature, the cooling rate in the drop tube, and the size of the droplets as well as other factors such as the "cleanliness" of the droplets, i.e., the concentration and potency of heterogeneous catalysts for droplet solidification.

Preferably in accordance with the invention, the temperature of the droplets when they reach the reactive gas zone H will be low enough to form at least a solidified exterior skin or shell of a detectable, finite shell thickness; e.g., a shell thickness of at least about 0.5 micron. Even more preferably, the droplets are solidified from the exterior surface substantially to the droplet core (i.e., substantially through their diametral cross-section) when they reach the reactive gas zone H. As mentioned above, radiometers or laser doppler velocimetry devices, may be spaced axially apart along the length of the vertical drop section 12*a* to measure the temperature of the atomized droplets D as they fall through the drop tube and cool in temperature, thereby sensing or detecting when at least a solidified exterior shell of finite thickness has formed on the droplets. As will be explained in Example 1 below, the formation of a finite solid shell on the droplets can also be readily determined using a physical sampling technique in conjunction with macroscopic and microscopic examination of the powder samples taken at different axial locations downstream from the atomizing nozzle in the drop tube 12.

Referring to FIG. 1, prior to atomization, a thermally decomposable organic material is deposited on a splash member 12*c* disposed at the junction of the drop tube vertical section 12*a* and lateral section 12*b* to provide sufficient carbonaceous material in the drop tube sections 12*a*, 12*b* below zone H as to form a carbon-bearing (e.g., graphite layer) on the hot droplets D after they pass through the reactive gas zone H. The organic material may comprise an organic cement to hold the splash member 12*c* in place in the drop tube 12. Alternately, the organic material may simply be deposited on the upper surface or lower surface of the splash member 12*c*. In any event, the material is heated during atomization to thermally decompose it and release gaseous carbonaceous material into the sections 12*a*, 12*b* below zone H. An exemplary organic material for use comprises Duco® model cement that is applied in a uniform, close pattern to the bottom of the splash member 12*c* to fasten it to the elbow 12*e*. Also, the Duco cement is applied as a heavy bead along the exposed uppermost edge of the splash member 12*c* after the initial fastening to the elbow. The Duco cement is subjected during atomization of the melt to temperatures in excess of 500° C. so that the cement thermally decomposes and acts as a source of gaseous carbonaceous material to be released into drop tube sections 12*a*, 12*b* beneath the zone H. The extent of heating and thermal decomposition of the cement and, hence, the concentration of carbonaceous gas available for powder coating is controlled by the position of the splash member 12*c*, particularly the exposed upper most edge, relative to the initial melt splash impact region and the central zone of the spray pattern. To maximize the extent of heating and thermal decomposition, additional Duco cement can be laid down (deposited) as stripes on the upper surface of the splash member 12*c*.

Alternately, a second supplemental jet 50 can be disposed downstream of the first supplemental reactive gas jet 40. The second jet 50 is adapted to receive a carbonaceous material, such as methane, argon laced with paraffin oil and the like, from a suitable source (not shown) for discharge into the drop tube section 12*a* to form a graphitic carbon coating on the hot droplets D after they pass through the reactive gas zone H.

Powder collection is accomplished by separation of the powder particles/gas exhaust stream in the tornado centrifugal dust separator/collection chamber 14 by retention of separated powder particles in the valved powder-receiving container, FIG. 1.

In practicing the present invention using the apparatus of FIG. 1, the melt may comprise various reactive metals and alloys including, but not limited to, rare earth-transition metal magnetic alloys with and without boron as an alloyant, iron alloys, copper alloys, nickel alloys, titanium alloys, aluminum alloys, beryllium alloys, hafnium alloys as well as others that include one or more reactive alloying elements that are reactive with the reactive gas under the reaction conditions established at the reactive gas zone H.

In the rare earth-transition metal alloy, the rare earth and boron, if present, are reactive alloying elements that must be maintained at prescribed concentrations to provide desired magnetic properties in the powder product. The rare earth-transition metal alloys typically include, but are not limited to, Tb-Ni, Tb-Fe and other refrigerant magnetic alloys and rare earth-iron-boron alloys described in the U.S. Pat. Nos. 4,402,770; 4,533,408; 4,597,938 and 4,802,931 where the rare earth is selected from one or more of Nd, Pr, La, Tb, Dy, Sm, Ho, Ce, Eu, Gd, Er, Tm, Yb, Lu, Y and Sc. The lower weight lanthanides (Nd, Pr, La, Sm, Ce, Y Sc) are preferred. The present invention is especially advantageous in the manufacture of protectively coated rare earth-nickel, rare earth-iron and rare earth-iron-boron alloy powder exhibiting significantly reduced reactivity to the aforementioned environmental constituents. When making rare earth-iron-boron atomized powder, alloys rich in rare earth (e.g., at least 27 weight %) and rich in B (e.g., at least 1.1 weight %) are preferred to promote formation of the hard magnetic phase, $Nd_2Fe_{14}B$, in an equiaxed, blocky microstructure devoid of ferritic Fe phase. Nd-Fe-B alloys comprising about 26 to 36 weight % Nd, about 62 to 68 weight % Fe and about 0.8 to 1.6 weight % B are useful as a result of their demonstrated excellent magnetic properties. Alloyants such as Co, Ga, La, and others may be included in the alloy composition, such as 31.5 weight % Nd—65.5 weight % Fe—1.408 weight % B—1.592 weight % La and 32.6 weight % Nd—50.94 weight % Fe—14.1 weight % Co—1.22 weight % B—1.05 weight % Ga, which is cited in Example 4.

Iron alloys, copper alloys and nickel alloys may include aluminum, silicon, chromium, rare earth elements, boron, titanium, zirconium and the like as the reactive alloying element to form a reaction product with the reactive gas under the reaction conditions at the reactive gas zone H.

The reactive gas may comprise a nitrogen bearing gas, oxygen bearing gas, carbon bearing gas and the like that will form a stable reaction product comprising a refractory compound, particularly an environmentally protective barrier layer, with the reactive alloying element of the melt composition. Illustrative of stable refractory reaction products are nitrides, oxides, carbides, borides and the like. The particular reaction product formed will depend on the composition of the melt, the reactive gas composition as well as the reaction conditions existing at the reactive gas zone H. The protective barrier (reaction product) layer is selected to passivate the powder particle surface and provide protection against environmental constituents, such as air and water in the vapor or liquid form, to which the powder product will be exposed during subsequent fabrication to an end-use shape and during use in the intended service application.

The depth of penetration of the reaction product layer into the droplets is controllably limited by the droplet temperature (extent of exterior shell solidification) and by the reaction conditions established at the reactive gas zone H. In particular, the penetration of the reaction product layer (i.e., the reactive gas species, for example, nitrogen) into the droplets is limited by the presence of the solidified exterior shell so as to avoid selective removal of the reactive alloying element (by excess reaction therewith) from the droplet core composition to a harmful level (i.e., outside the preselected final end-use concentration limits) that could substantially degrade the end-use properties of the powder product. For example, with respect to the rare earth-transition metal alloys with and without boron as an alloyant, the penetration of the reaction product layer is limited to avoid selectively removing the rare earth alloyant and the boron alloyant, if present, from the droplet core composition to a harmful level (outside the prescribed final end-use concentrations therefor) that would substantially degrade the magnetic properties of the powder product in magnet applications. In accordance with the invention, the thickness of the reaction product layer formed on rare earth-transition metal alloy powder is limited so as not to exceed about 500 angstroms, preferably being in the range of about 200 to about 300 angstroms, for powder particle sizes (diameters) in the range of about 1 to about 75 microns, regardless of the type of reaction product layer formed. Generally, the thickness of the reaction product layer does not exceed 5% of the major coated powder particle dimension (i.e., the particle diameter) to this end.

With Nd-Fe-B type alloys, the Nd content of the alloy was observed to be decreased by about 1–2 weight % in the atomized powder compared to the melt as a result of melting and atomization, probably due to reaction of the Nd during melting with residual oxygen and formation of a moderate slag layer on the melt surface. The iron content of the powder increased relatively as a result while the boron content remained generally the same. The initial melt composition can be adjusted to accommodate these effects.

As will become apparent from the Examples below, the reaction barrier (reaction product) layer may comprise multiple layers of different composition, such as an inner nitride layer formed on the droplet core and an outer oxide type layer formed on the inner layer. The types of reaction product layers formed again will depend upon the melt composition and the reaction conditions present at the reactive gas zone H.

As mentioned above, a carbon-bearing layer may be formed in-situ on the reaction product layer by various reaction techniques. The carbon-bearing layer typically comprises graphitic carbon formed to a thickness of at least about 1 monolayer (2.5 angstroms) regardless of the reaction technique employed. The graphitic carbon layer provides protection to the powder product against such environmental constituents as liquid water or water vapor as, for example, is present in humid air. The carbon layer also facilitates wetting of the powder product by binders used in injection molding processes for forming end-use shapes of the powder product.

The following Examples are offered to further illustrate, but not limit, the present invention. The Examples were generated using an apparatus like that shown in FIG. 1.

EXAMPLE 1

The melting furnace was charged with an Nd—16 weight % Fe master alloy as-prepared by thermite reduction, an Fe-B alloy carbo-thermic processed and obtained from the Shieldalloy Metallurgical Corp. and electrolytic Fe obtained from Glidden Co. The charge was melted in the induction melting furnace after the melting chamber and the drop tube were evacuated to $10^{-4}$ atmosphere and then pressurized with argon to 1.1 atmosphere to provide melt of the composition 32.5 weight % Nd—66.2 weight % Fe—1.32 weight % B. The melt was heated to a temperature of 3002° F. (1650° C.). After a hold period of 10 minutes to reduce (vaporize) Ca present in the melt (from the thermite reduced Nd-Fe master alloy) to melt levels of 50–60 ppm by weight, the melt was fed to the atomizing nozzle by gravity flow upon raising of the boron nitride stopper rod. The atomizing nozzle was of the type described in U.S. Pat. No. 4,619,845 as modified (see FIGS. 4–7) to include (a) a divergent manifold expansion region 120 between the manifold gas inlet 116 and the arcuate manifold, segment 118 and (b) an increased number (i.e., 20) of gas jet discharge orifices 130 that are NC (numerical control) machined to be in close tolerance tangency T (e.g., within 0.002 inch, preferably within 0.001 inch) to the inner bore 133 of the nozzle body 104 to provide improved laminar gas flow over the frustoconical surface 134 of the two-piece nozzle melt tube 132 (i.e., inner boron nitride melt supply tube 132*c* and outer type 304 stainless steel tube 132*b* with thermal insulating space 132*d* therebetween). The divergent expansion region 120 minimizes wall reflection shock waves as the high pressure gas enters the manifold to avoid formation of standing shock wave patterns in the manifold, thereby maximizing filling of the manifold with gas. The manifold had an $r_0$ of 0.3295 inch, $r_1$ of 0.455 inch and $r_2$ of 0.642 inch. The number of discharge orifices 130 was increased from 18 (patented nozzle) to 20 but the diameter thereof was reduced from 0.0310 and (patent nozzle) to 0.0292 inch to maintain the same gas exit area as the patented nozzle. The modified atomizing nozzle was found to be operable at lower inlet gas pressure while achieving more uniformity in particle sizes produced; e.g., increasing the percentage (yield) of powder particles falling in the desired particle size range (e.g., less than 38 microns diameter) for optimum magnetic properties for the Nd-Fe-B alloy involved from about 25 weight % to about 66–68 weight %. The yield of optimum particle sizes was thereby increased to improve the efficiency of the atomization process. The modified atomizing nozzle is described in copending U.S. patent application entitled "Improved Atomizing Nozzle And Process" Ser. No. 07/593,942, now U.S. Pat. No. 5,125,574, the teachings of which are incorporated herein by reference.

Argon atomizing gas at 1100 psig was supplied to the atomizing nozzle. The reactive gas jet was located 75 inches downstream from the atomizing nozzle in the drop tube. Ultra high purity (99.995%) nitrogen gas was supplied to the jet at a pressure of 100 psig for discharge into the drop tube to establish a nitrogen gas reaction zone or halo extending across the drop tube such that substantially all the droplets traveled through the zone. At this location downstream from the atomizing nozzle, the droplets were determined to be at a temperature of approximately 1832° F. (1000° C.) or less, where at least a finite thickness solidified exterior shell was present thereon. This determination was made in a prior experimental trail using a technique described below. After the droplets traveled through the reaction zone, they were collected in the collection container of the collection chamber (e.g., see FIG. 2). The coated solidified powder product was removed from the collection chamber when the powder reached approximately 72° F. The solidified powder particles were produced in the particle size (diameter) range of about 1 to about 100 microns with a majority of the particles being less than 38 microns in diameter.

Figure 2:
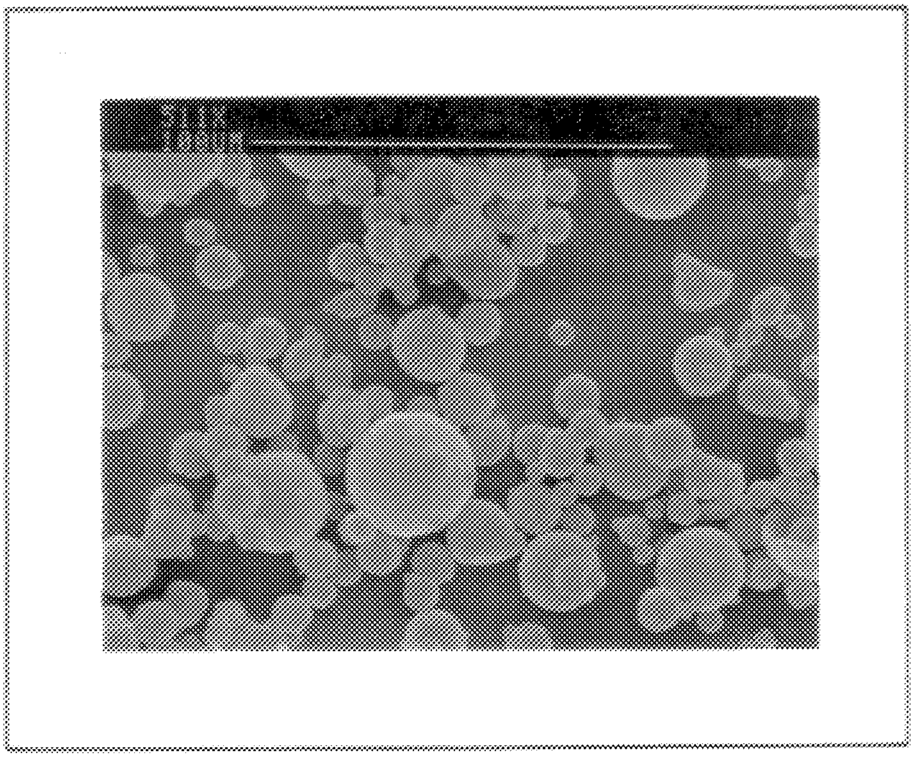
FIG. 2 is a photomicrograph of a collection of coated powder particles made in accordance with Example 1 illustrating the spherical particle shape.

FIG. 2 is a photomicrograph of a collection of the coated powder particles. The powder particle comprises a core having a particular magnetic end-use composition and a nitride layer (refractory reaction product) formed thereon having a thickness of about 250 angstroms. Auger electron spectroscopy (AES) was used to gather surface and near-surface chemical composition data on the particles. The AES analysis indicated a near-surface enrichment of boron and nitrogen consistent with the initial formation of a boron nitride layer. If no boron is present in the alloy (e.g., a Tb-Ni or Tb-Fe alloy), the nitride layer will comprise a rare earth nitride.

The collected powder particles were tested for reactivity by repeated contact with the spark discharge of a tesla coil in air, a so called "spark test". The spark test results showed no apparent "sparkler" effect and no sustained red glow, indicating that the coated powder particles of the invention exhibited significantly reduced reactivity as compared to uncoated powder particles of the same composition.

The determination of the presence of at least a finite thickness solidified skin or shell on the droplets when they reached the nitrogen gas zone was made by locating an array of spray probe wires in the drop tube downstream of the atomizing nozzle. In particular, starting at about 8 inches below the atomizing nozzle, an array of ten (10) single Ni-Cr alloy wires was positioned across the diameter of the drop tube. The wires were spaced apart by 6 inches in the array along the length of the drop tube to just above the location of the nitrogen jet. Each wire in the array was offset 90° relative to the neighboring wires.

The degree of solidification of the droplets in the droplet spray pattern was estimated by macroscopic and microscopic analysis of the deposits collected on each wire array. Macroscopic analysis showed that liquid or semi-solid droplet particles were collected on wire arrays that were spaced from a position closest to the atomizing nozzle (i.e., 8 inches downstream) to a position about 50 inches downstream therefrom. Beyond a downstream distance of about 50 inches, there was no longer any significant population of droplet particles deposited on the wire arrays. Microstructural analysis of transverse sections of the droplet deposits attached to the wires indicated that at least a finite thickness exterior surface shell was formed at a distance of about 50 inches.

Since the supplemental nitrogen jet was located about 75 inches downstream of the atomizing nozzle, the reaction of the nitrogen gas and the droplets took place when the droplets were solidified at least to the extent of having a solid finite thickness surface shell thereon strong enough to resist adherence to the last two wires in the array.

In Example 1, the splash member 12*c* was positioned so as to allow only very local heating and minimal decomposition of the Duco cement bond layer holding the splash member to the elbow 12*e*, avoiding contact of the cement with the uppermost edge of the splash member. As a result, only a one monolayer thickness of the carbon-bearing layer was observed to form on the particles.

EXAMPLE 2

A melt of the composition 33.0 weight % Nd—65.9 weight % Fe—1.1 weight % B was melted in the melting furnace after the melting chamber and the drop tube were evacuated to $10^{-4}$ atmosphere and then pressurized with argon to 1.1 atmosphere. The melt was heated to a temperature of 3002° F. and fed to the atomizing nozzle of the type described in Example 1 by gravity flow upon raising of the stopper rod. Argon atomizing gas at 1050 psig was supplied to the atomizing nozzle. The reactive gas jet was located 75 inches downstream from the atomizing nozzle in the drop tube. Ultra high purity nitrogen gas was supplied to the jet at a pressure of 100 psig for discharge into the drop tube to establish a nitrogen gas reaction zone or halo extending across the drop tube such that substantially all the droplets traveled through the zone. At this location downstream from the atomizing nozzle, the droplets were determined to be at a temperature of approximately 1832° F. or less, where at least a finite thickness solidified exterior shell was present thereon as determined by the technique described above. After the droplets traveled through the reaction zone, they were collected in the collection container. The solidified powder product was removed from the collection chamber when the powder reached approximately 72° F. The solidified powder particles were produced in the size (diameter) range of about 1 to 100 microns with a majority of the particles having a diameter less than about 44 microns.

Figure 3:
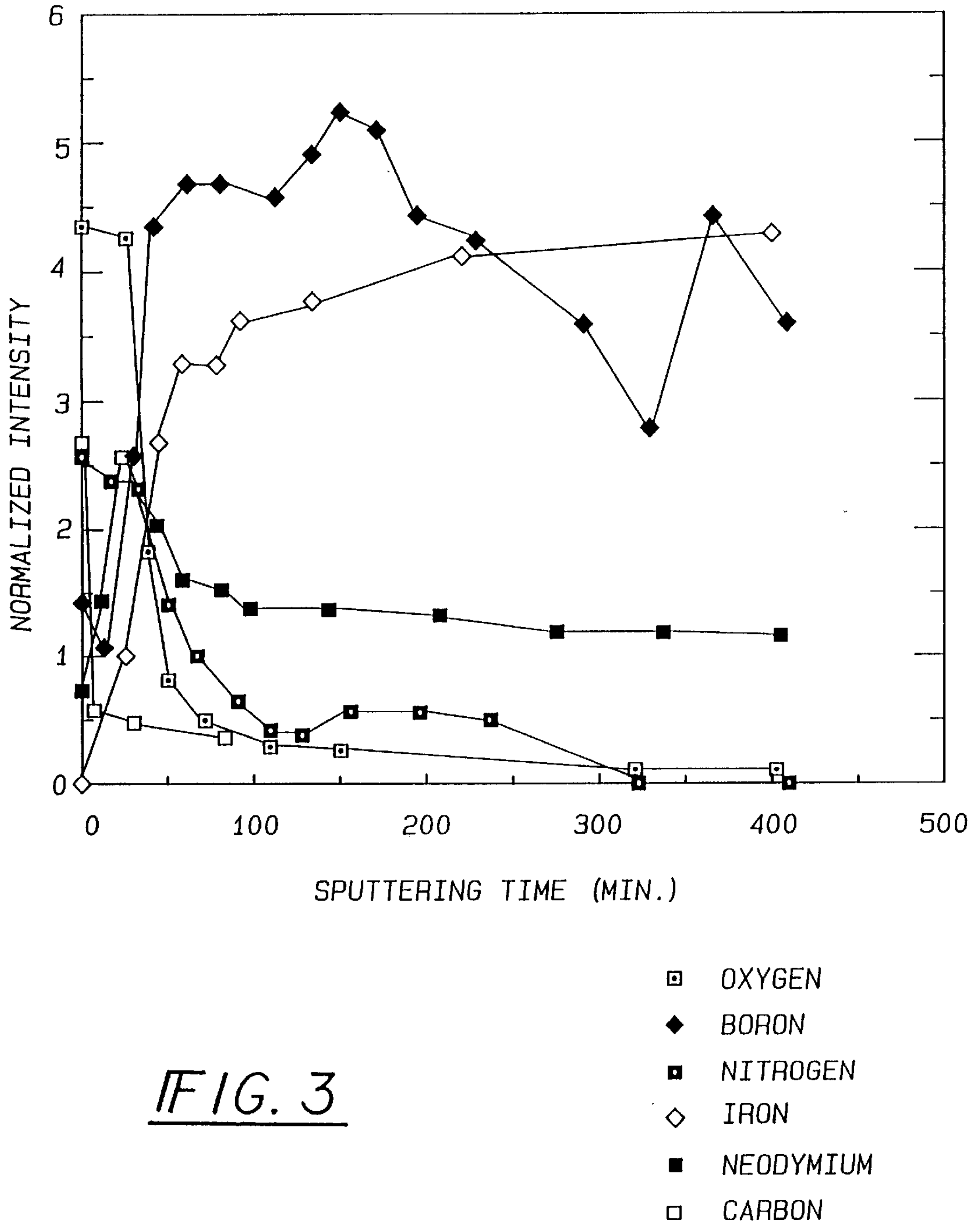
FIG. 3 is an AES depth profile of a coated powder particle made in accordance with Example 2 illustrating the reaction product layers formed.
Figure 4:
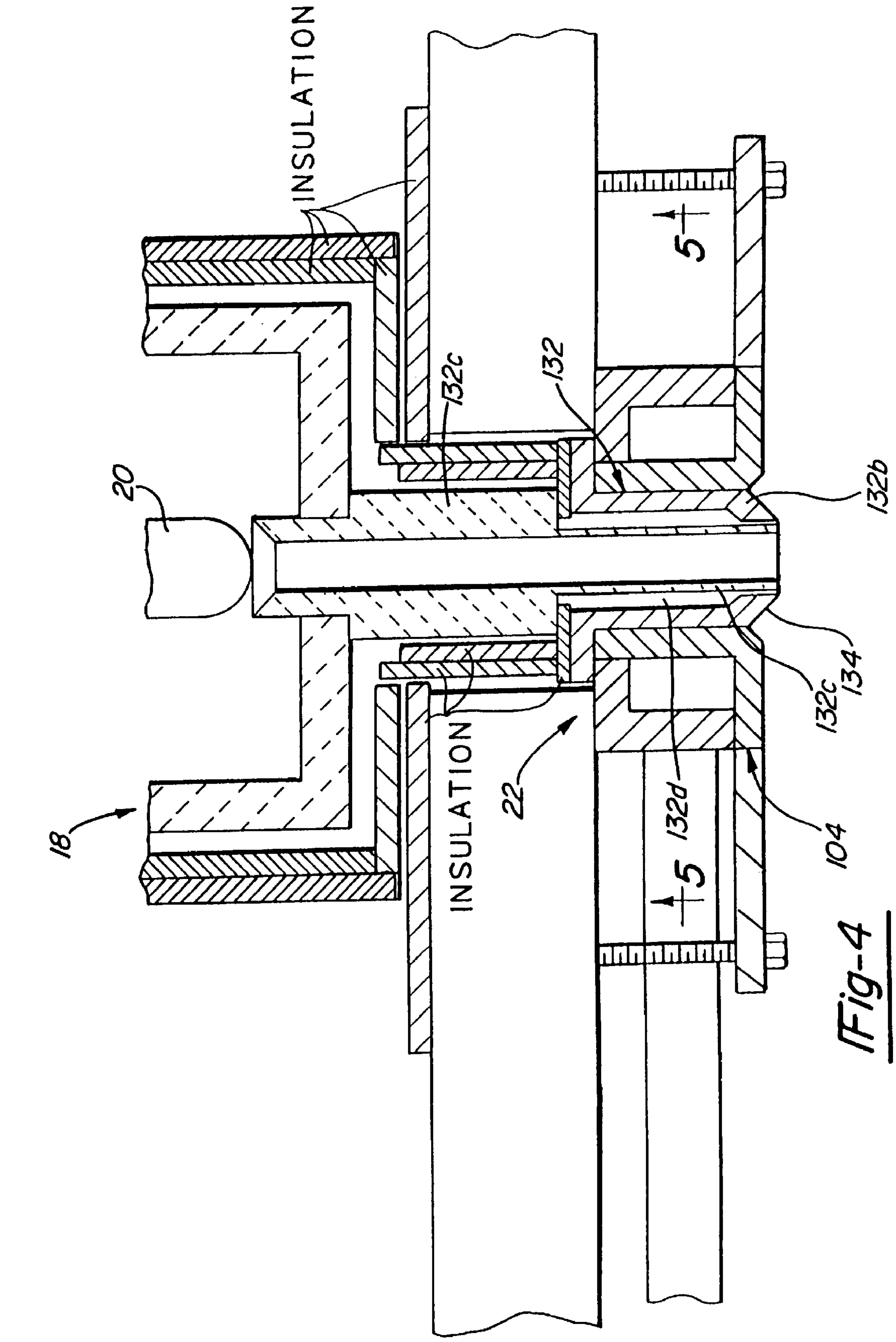
FIG. 4 is a side elevation of a modified atomizing nozzle used in the Examples.
Figure 5:
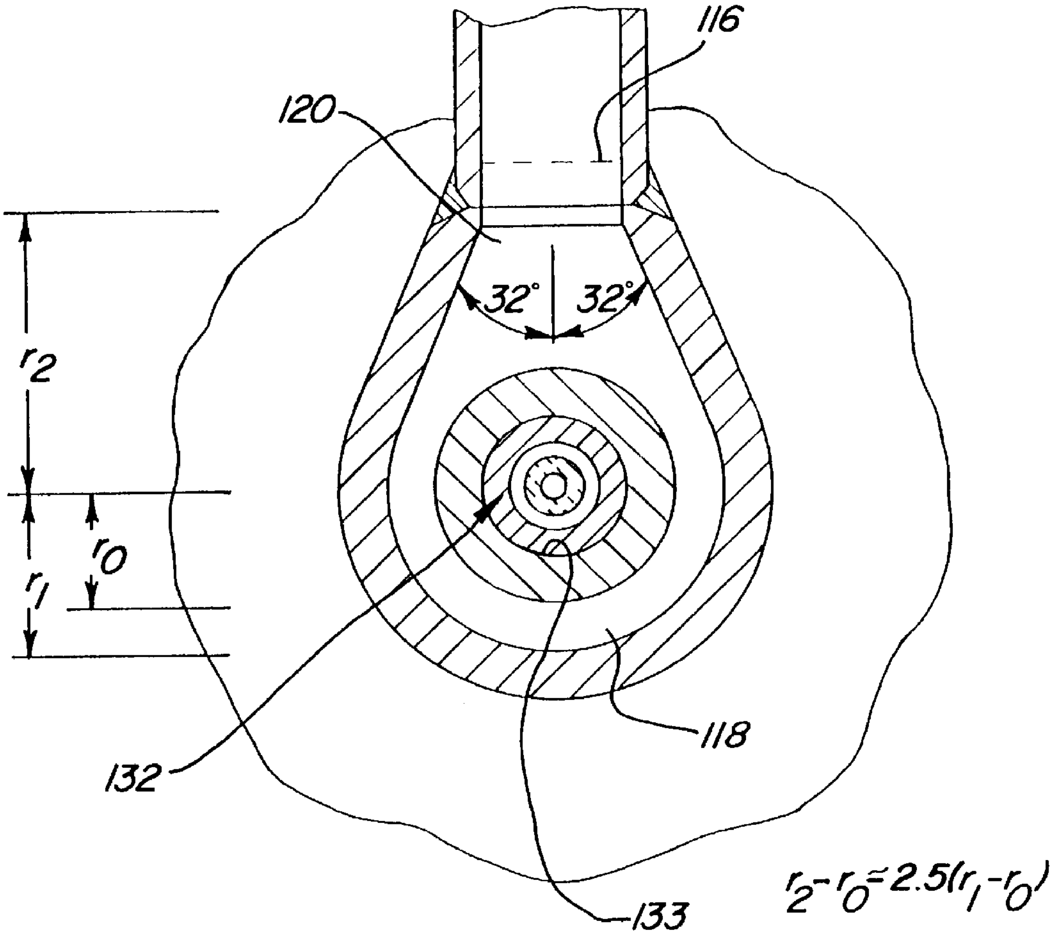
FIG. 5 is a sectional view of a modified atomizing nozzle along lines 5—5.
Figure 7:
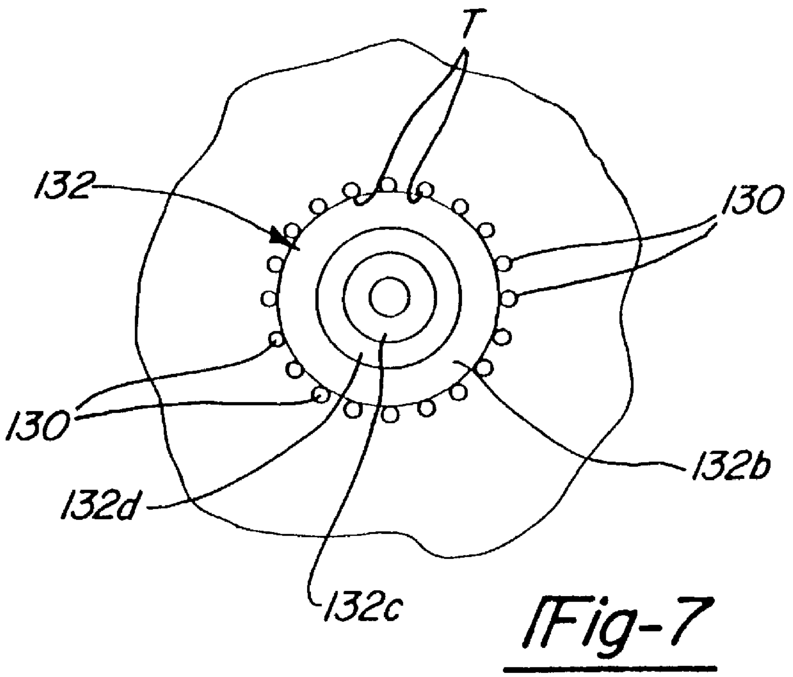
FIG. 7 is a bottom plan view of the modified atomizing nozzle.
Figure 6:
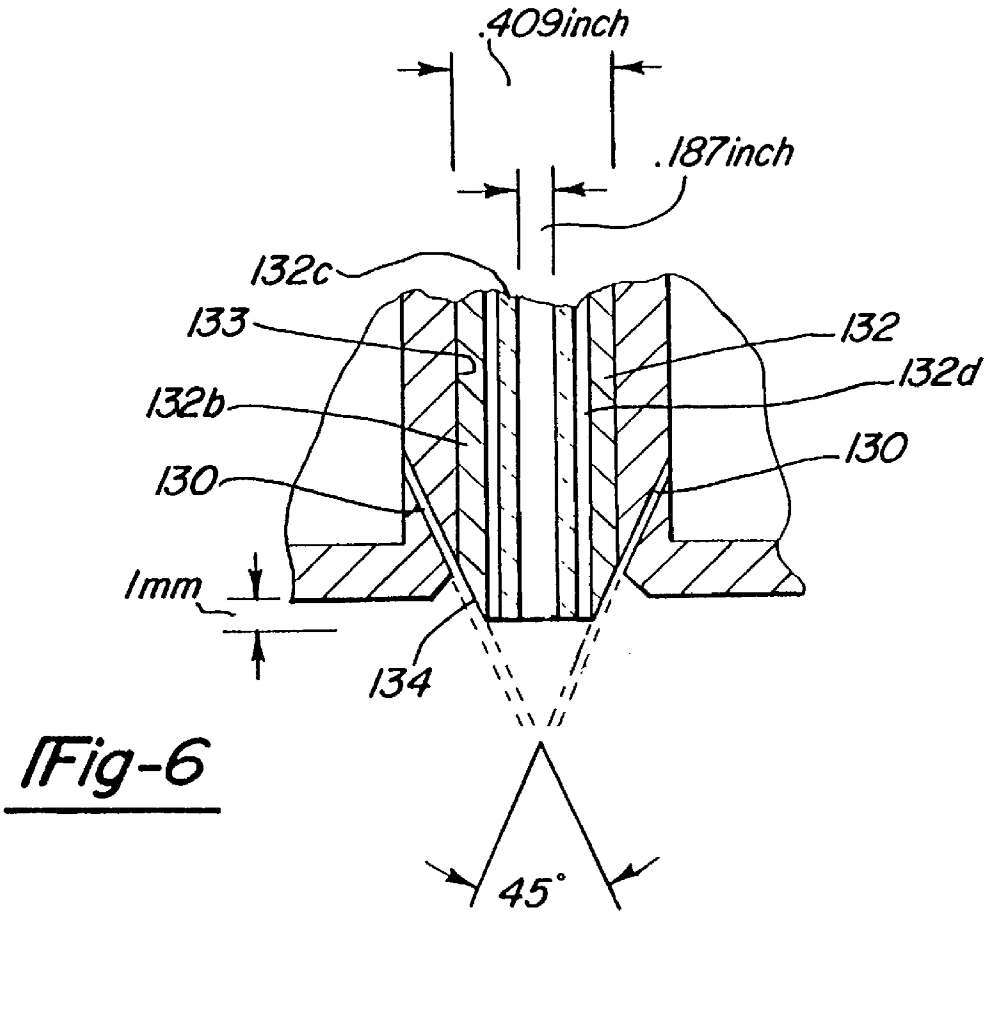
FIG. 6 is a fragmentary sectional view of the modified atomizing nozzle showing gas jet discharge orifices aligned with the nozzle melt supply tube surface.

The powder particles comprised a core having a particular magnetic end-use composition and a protective refractory layer thereon having a total thickness of about 300 angstroms. Auger electron spectroscopy (AES) was used to gather surface and near-surface chemical composition data on the particles using in-situ ion milling to produce the depth profile shown in FIG. 3. The AES analysis indicated an inner surface layer composition of enriched in nitrogen, boron and Nd corresponding to a mixed Nd-B nitride (refractory reaction product). The first layer (inner) was about 150 to 200 angstroms in thickness. A second layer enriched in Nd, Fe and oxygen was detected atop the nitride layer. This second layer corresponded to a mixed oxide of Nd and Fe (refractory reaction product) and is believed to have formed as a result of decomposition and oxidation of the initial nitride layer while the powder particles were still at elevated temperature. The second layer was about 100 angstroms in thickness. An outermost (third) layer of graphitic carbon was also present on the particles. This outermost layer was comprised of graphitic carbon with some traces of oxygen and had a thickness of at least about 3 monolayers. This outermost carbon layer is believed to have formed as a result of thermal decomposition of the Duco cement (used to hold the splash member 12*c* in place in the drop tube) and subsequent deposition of carbon on the hot particles after they passed through reactive gas zone H so as to produce the graphitic carbon film or layer thereon. Subsequent atomizing runs with and without excess Duco cement present confirmed that the cement was functioning as a source of gaseous carbonaceous material for forming the graphite outer layer on the particles. The Duco cement typically is present in an amount of about one (1) ounce cement for atomization of 4.5 kilogram melt to form the graphite layer thereon.

The collected powder particles were tested for reactivity by the spark test described above. The test results showed no tendency for burning or "sparklers" indicating that the in-situ coated powder particles of this Example exhibited significantly reduced reactivity as compared to uncoated powder particles of the same composition.

The powder particles were fabricated into a magnet shape by mixing with a polymer blend binder, namely a 2 to 1 blend of a high melt flow/low melting polyethylene (e.g., Grade 6 available from Allied Corp., Morristown, N.J.) and a stronger, moderate melt flow, linear, low density polyethylene (e.g., Grade Clarity 5272 polyethylene-ASTM NA153 or a PE2030 polyethylene available form CFC Prime Alliance, Des Moines, Iowa), and then injection molding the mixture in a die in accordance with copending U.S. patent application entitled "Method of Making Bonded On Sintered Permanent Magnets" Ser. No. 07/593,943, now U.S. Pat. No. 5,240,513, the teachings of which are incorporated herein by reference. The presence of the carbon-bearing layer was found to significantly enhance wettability of the powder by the polymer blend binder so as to avoid the need to use a surfactant chemical addition.

EXAMPLE 3

A melt of the composition 32.5 weight % Nd—66.2 weight % Fe—1.32 weight % B was melted in the melting furnace after the melting chamber and the drop tube were evacuated to $10^{-4}$ atmosphere and then pressurized with argon at 1.1 atmosphere. The melt was heated to a temperature of 3002° F. and fed to the atomizing nozzle of the type described in Example 1 by gravity flow upon raising of the stopper rod. Argon atomizing gas at 1100 psig was supplied to the atomizing nozzle. The reactive gas jet was located 75 inches downstream of the atomizing nozzle in the drop tube. Ultra high purity nitrogen gas was supplied to the jet at a pressure of 100 psig for discharge into the drop tube after atomization of the melt and collection of the powder particles. In particular, the nitrogen jet was not turned on until after the melt was atomized and the solidified powder particles were collected in the collection chamber (FIG. 1). Then, while the particles were still at an elevated temperature (e.g., 500° F.), nitrogen was discharged from the supplemental jet into the drop tube, adding about 0.2 atmosphere of nitrogen partial pressure to react with the hot particles remaining in the drop tube and those residing in the collection container. The solidified powder product was removed from the collection container when the powder reached approximately 72° F. Only a modest amount of Duco cement was thermally decomposed to form a protective carbon-bearing layer of about one monolayer on the particles.

The collected powder particles were tested for reactivity by spark test. The test results again showed no explosive tendency, indicating that the in-situ coated powder particles of the invention exhibited significantly reduced reactivity as compared to uncoated powder particles of the same composition.

EXAMPLE 4

A melt of the composition 32.6 weight % Nd—50.94 weight % Fe—1.22 weight % B—14.1 weight % Co—1.05 weight % Ga was melted in the melting furnace after the melting chamber and the drop tube were evacuated to $10^{-4}$ atmosphere and then pressurized with argon to 1.1 atmosphere. The melt was heated to a temperature of 2912° F. and fed to the atomizing nozzle of the type described in Example 1 by gravity flow upon raising of the stopper rod. Argon atomizing gas at 1100 psig was supplied to the atomizing nozzle. The reactive gas jet was located 75 inches downstream of the atomizing nozzle in the drop tube. Ultra high purity nitrogen gas was supplied to the jet at a pressure of 100 psig for discharge into the drop tube to establish a nitrogen gas reaction zone or halo extending across the drop tube such that substantially all the droplets traveled through the zone. At this location downstream from the atomizing nozzle, the droplets were determined to be at a temperature of approximately 1832° F. or less, where at least a finite thickness solidified exterior shell was present thereon. After the droplets traveled through the reaction zone, they were collected in the collection container. A moderate amount of Duco cement was thermally decomposed during atomization to form a protective carbon-bearing layer of about one monolayer on the particles. The solidified droplets or powder product was removed from the collection chamber when the powder reached approximately 72° F.

The powder particles comprised a core having a particular magnetic end-use composition and a protective refractory layer thereon having a total thickness of about 300 angstroms. Auger electron spectroscopy (AES) was used to gather surface and near-surface chemical composition data on the particles. The AES analysis indicated a chemical depth profile similar to that for Example 2 corresponding to approximately 3 coating layers: an outer graphite layer, a middle Nd-B oxide layer, and an inner Nd-B mixed nitride layer.

The collected powder particles were tested for reactivity by the spark test. The test results showed no explosive tendency, indicating that the in-situ coated powder particles of the invention exhibited significantly reduced reactivity as compared to uncoated powder particles of the same composition.

EXAMPLE 5

A melt of the composition 87.4 weight % Al—12.6 weight % Si was melted in the melting furnace after the melting chamber and the drop tube were evacuated to $10^{-4}$ atmosphere and then pressurized with argon to 1.1 atmosphere. The melt was heated to a temperature of 1832° F. and fed to the atomizing nozzle of the type described in Example 1 by gravity flow upon raising of the stopper rod. Argon atomizing gas at 1100 psig was supplied to the atomizing nozzle. The reactive gas jet was located 24 inches downstream of the atomizing nozzle in the drop tube. Ultra high purity nitrogen gas was supplied to the jet at a pressure of 150 psig for discharge into the drop to establish a nitrogen gas reaction zone or halo extending across the drop tube such that substantially all the droplets traveled through the zone. At this location downstream from the atomizing nozzle, the droplets were estimated to be at a temperature where at least a finite thickness solidified exterior shell was present thereon. After the droplets traveled through the reaction zone, they were collected in the collection container. The solidified droplets or powder product was removed from the collection chamber when the powder reached approximately 72° F. As a result of the significantly reduced atomization spray temperature, no significant thermal decomposition of the Duco, cement bonding the splash member 12*c* took place and, thus, a graphite layer was not formed on the particles.

The powder particles comprised a core having a particular end-use composition and a nitride surface layer thereon having a thickness of about 500 angstroms. X-ray diffraction analysis suggested a surface layer corresponding to crystalline silicon nitride and an unidentified amorphous layer.

The collected powder particles were tested for reactivity to by the spark test. The test results showed no burning or explosivity, indicating that the in-situ coated powder particles of the invention exhibited significantly reduced reactivity as compared to uncoated powder particles of the same composition.

While the invention has been described in terms of specific embodiments thereof, it is not intended to be limited thereto but rather only to the extent set forth hereafter in the following claims.

We claim:

1. Rare earth-transition metal-boron alloy powder, comprising a core comprising said alloy, an inner nitride layer on the core and an outer substantially carbon layer on the inner layer.

2. The powder of claim 1 wherein the substantially carbon layer comprises graphite.

3. Rare earth-transition metal-boron alloy powder, comprising a core comprising said alloy, an inner layer comprising boron nitride, an outer substantially carbon layer and an intermediate layer enriched in rare earth, transition metal and oxygen between the inner an outer layers.

4. The powder of claim 3 wherein the substantially carbon layer comprises graphite.

5. The powder of claim 3 wherein the inner layer has a thickness of up to about 500 angstroms.

6. The powder of claim 5 wherein the outer layer has a thickness of at least about 1 monolayer.

7. The powder of claim 1 wherein the outer layer comprises a graphitic carbon layer.

8. The powder of claim 3 wherein the inner layer and the intermediate layer together have a thickness of up to about 500 angstroms.

9. The powder of claim 1 that comprises rare earth-iron-boron alloy where the rare earth is selected from the group consisting of Nd, Pr, La, Tb, Dy, Sm, Ho, Ce, Eu, Gd, Er, Tm, Yb, Lu, Y, and/or Sc.

10. Rare earth-tranistion metal alloy powder, said powder comprising atomized, generally spherical particulate comprising a core comprising said alloy and a surface reaction product layer on the core formed by reaction between at least one reactive alloy component and a gas reactive therewith when said particulate is in the as-atomized condition and at least partially solidified exteriorily, said layer comprising a refractory compound of the rare earth not exceeding about 500 angstroms in thickness, and a substantially carbon layer disposed on said layer.

11. The powder of claim 10 wherein the refractory compound comprises a nitride of the rare earth.

12. The powder of claim 10 wherein the substantially carbon layer is graphite.

* * * * *